United States Patent Office 3,308,791
Patented Mar. 14, 1967

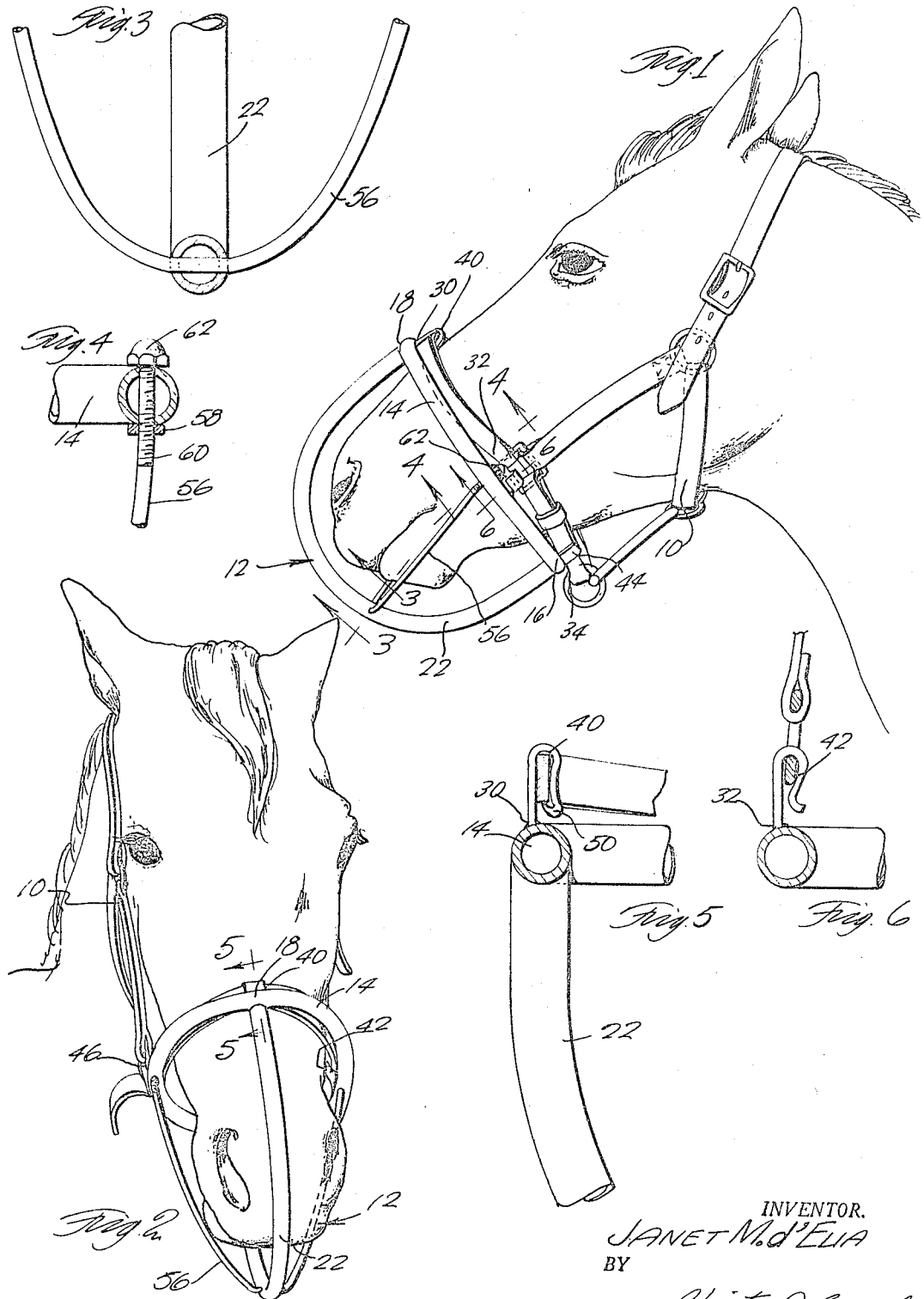

3,308,791
ANTI-CRIBBING MASK FOR HORSES
Janet M. d'Elia, 401 Sherbrook Drive,
Silver Spring, Md. 20904
Filed Oct. 20, 1965, Ser. No. 498,307
4 Claims. (Cl. 119—129)

The present invention relates to an anti-cribbing mask or apparatus for horses particularly adapted for tending to prevent horses, especially thoroughbred horses used for racing, from cribbing, and more particularly the invention relates to a mask or apparatus that is applicable to animals such as horses, that tends to inhibit such animals from practicing the nervous habit of cribbing wherein the animal draws air into his stomach and this affects his breathing when used for racing.

A cribber is a horse who takes hold of a board or other projection in his stall, such as the boards forming his feed crib, and sucks air through his mouth while the lower lip is being urged against such projection. Air is swallowed by the horse into his stomach. The air is accumulated in the stomach and the horse then makes a sound something like a belch by discharge of the air from the stomach. Apparently, cribbing is a nervous habit that a horse acquires, and it is found that the problem of cribbers is faced by every trainer sooner or later. In a stable where horses are under close supervision, cribbing may be detected at its beginning. Often the animal can be cured if the necessary measures are taken early enough by the use of special neck straps sold by harness dealers for this purpose, but these prior art devices apply pressure at the throat and become uncomfortable and appear to discourage the horse from eating or drinking. It has been found that anything a horse can grasp between his teeth for cribbing should be removed from the stall, but this is not always possible where a feed crib or box must be provided.

The main object of any type of anti-cribbing device is to provide a comfortable apparatus that does not prevent the horse from eating less than normal, and it is an object of the present invention to satisfy these requirements. It has been found that a cribber shows little or no preference for cribbing in or out of the stable so long as a selected object serves his purpose. It has even been found that horses will crib on one of their forelegs. While cribbing is not always characterized by detracting from normal breathing, it is often characterized by extensive wear on the teeth. When a cribber has obtained his required support on which to practice cribbing, he will take air into his partly opened mouth, and having drawn in his chin toward his breast and arched his back, he will then make a convulsive effort to swallow the mouthful of air and at the same time will emit a characteristic grunt.

It is an object therefore of the invention to provide an anti-cribbing mask or structure for horses and other animals, that is attached to a halter means that allows the animal to eat and drink in the normal fashion, but precludes the horse from cribbing.

A further object of the invention is to provide an apparatus that prevents animals from filling their mouths with air and acquire a nervous habit.

Another object of the invention is to reduce, if not entirely eliminate, the practice of cribbing by horses, since cribbers are generally considered unacceptable for sale, since cribbing affects the usefulness of a horse, making it nervous and thin.

While cribbing is not a contagious habit, by use of the apparatus of the invention, cribbers are discouraged from practicing the habit and the objects of the invention are realized.

The above and other objects and advantages of the invention will become apparent from full consideration of the following detailed description and accompanying drawings in which:

FIG. 1 is a side elevational view of the anti-cribbing mask, as may be attached to a halter;

FIG. 2 is a generally front perspective view of the anti-cribbing mask of FIG. 1;

FIG. 3 is a cross-sectional view taken along line 3—3 of FIG. 1;

FIG. 4 is a cross-sectional view taken along line 4—4 of FIG. 1;

FIG. 5 is a cross-sectional view taken along line 5—5 of FIG. 2; and

FIG. 6 is a cross-sectional view taken along line 6—6 of FIG. 1.

Referring now to the drawings, there is shown a horse having a halter 10 of conventional construction, at least in many particulars, and in which there is secured thereto an anti-cribbing mask or apparatus 12 constructed of a circular or oval contoured piece of flexible plastic tubing 14 connected to form a T-joint at the bottom 16 and the top 18 with a semicircular or arcuate conforming piece of such tubing 22, and which is adapted to extend over and about the nostrils and mouth of the horse, as shown generally in FIGS. 1 and 2.

More particularly, the oval piece of tubing 14 is connected at quadrant points 30, 32, 34, 36 to the halter 10 comprising the strap of fastening members 40, 42, 44, 46. At least two of these connections are illustrated clearly in FIGS. 5 and 6.

The fastening means 40 includes a return type hook with a retaining terminal end 50 and retains the strap within the securing means 40. Similarly, as shown in FIG. 6, there is a generally U-shaped retaining means 42 which is secured by link means to the hardness or halter 10.

A substantially U-shaped structural member 56 having an intermediate bight portion is shown in FIG. 3, as well as in other figures, and is provided to adequately dispose the oval element 14 and the semicircular element 22 in their relative positions, that may be said to proximate an arrangement of quadratures, although this is only a means of describing the arrangement in a general way.

The tubular members 14 and 22 are made of plastic of tubular form, or even of aluminum or other metals, while the member 56 is generally of solid construction, may be of metal, and is threaded at its terminal ends, as shown in FIG. 4, to engage the tubular member 14. A lock nut or similar means 58 is provided on the threaded portion 60 of structure member 56 to provide an adjustable free length for the end of the member 56 on which the tubular member 14 is to be applied, and on the free end of structure member 56 that remains there is provided, as shown, a finished or round-headed terminal nut 62.

Thus, it is seen that the invention provides an anti-cribbing mask for use with animals such as horses, so that the horse is not able to nervously apply its head for cribbing but is able to eat and drink.

Additional embodiments of the invention in this specification will occur to others and therefore it is intended that the scope of the invention be limited only by the appended claims and not by the embodiment described hereinabove Accordingly, reference should be made to the following claims in determining the full scope of the invention.

What is claimed is:

1. An anti-cribbing mask comprising an oval of tubular plastic material having generally quadrant zones, the mask having means adapted to be attached to a halter for a horse, said oval adapted to fit laterally over the nostrils and mouth of a horse, a semicircular piece of tubular plastic material terminating at its ends at an upper and a lower point of said oval, and proximate to the means for attachment to said halter, said semicircular tubular plastic material adapted to extend peripherally of the nostrils and mouth of the horse without engagement thereto, and a substantially U-shaped structural member for supporting the intermediate part of the semicircular tubular plastic material in rigid relation with respect to similar intermediate points of the oval tubular plastic material and threadedly adjustably secured thereto, said arrangement being adapted for preventing cribbing by animals.

2. The invention according to claim 1 wherein said plastic material is metal.

3. The invention according to claim 1 wherein said plastic material for the oval and semicircular plastic material is non-metal.

4. The invention according to claim 1 wherein said attaching means are provided in quadrant relation about said oval tubular plastic material.

References Cited by the Examiner
UNITED STATES PATENTS

| | | | |
|---|---|---|---|
| 1,285,838 | 11/1918 | Swender | 119—131 |
| 1,351,140 | 8/1920 | Stoker | 119—130 |
| 1,592,137 | 7/1926 | East | 119—130 |
| 1,773,774 | 8/1930 | Carr | 119—129 |

FOREIGN PATENTS 6,139    8/1913    Great Britain.

SAMUEL KOREN, *Primary Examiner.*

ALDRICH F. MEDBERY, *Examiner.*